Sept. 28, 1926.  E. LIGONNET  1,601,029

PROCESS FOR JOINING CONCRETE TUBES

Filed Jan. 20, 1925

Inventor
E. Ligonnet
By Markov Clark Attys.

Patented Sept. 28, 1926.

1,601,029

UNITED STATES PATENT OFFICE.

EUGÈNE LIGONNET, OF PARIS, FRANCE.

PROCESS FOR JOINING CONCRETE TUBES.

Application filed January 20, 1925, Serial No. 3,675, and in France October 21, 1924.

This invention relates to a process for joining together members composed of concrete, reinforced or otherwise, wood, metal, etc., flat, arched or of any other shape, coated with asphalt, asphalt-concrete, pitch rubberized or otherwise, bitumen, or any other plastic material, and more particularly members made according to my pending application for Letters Patent of the United States Serial No. 706,790, filed 15th April 1924, in such a manner as to make a completely tight joint between said members, and more particularly in lines of piping coated with these materials, by producing a continuous coating free from hollows and projections.

The process according to the present invention consists in placing in contact the ends of members coated with the aforesaid plastic materials, softening them by heat and cementing them together by compression, followed by the application of the same plastic materials to the recesses produced by these operations, in order to consolidate the joint, so as to obtain impervious coatings free from hollows, projections or joints.

Figure 1:
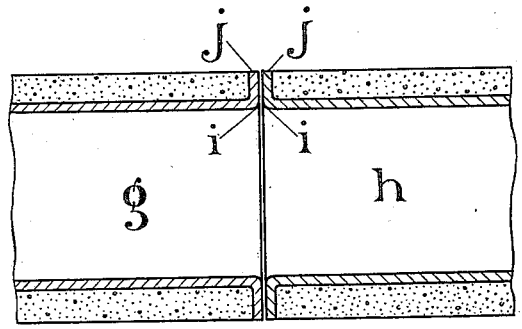
Figure 2:
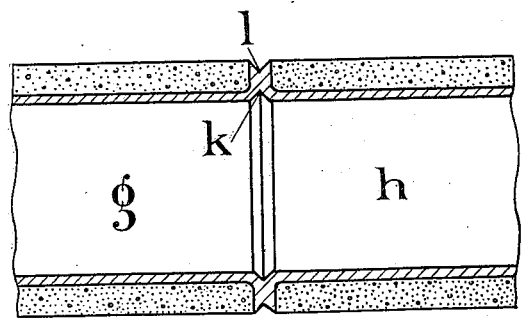
Figure 3:
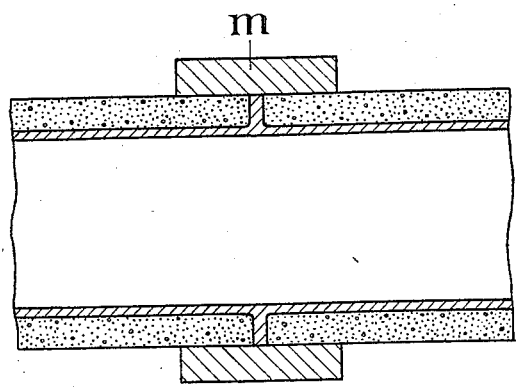

Referring to the accompanying drawings, Figures 1, 2 and 3 show three successive stages of the process applied to the joining together of two pipe ends, represented in axial section.

The pipes $g\ h$ are placed end to end (Figure 1). By means of a metal apparatus (not shown) more particularly of nickel, of suitable shape, and heated, by gas, petrol, or the like, but preferably by electricity, to a suitable temperature, the inner edges $i$ and outer edges $j$ of the pipes $g$ and $h$ are heated, whilst being pressed tightly together, with the object of softening the plastic material so as to render it impervious, and to weld this material together by powerful compression (Figure 2). This operation causes a slight depression to form at $k$ and $l$, in the inner and outer edges of the ends, and similar material, either cold or previously softened, is applied to said depression, incorporated and welded in the same manner, being afterwards smoothed down in order to obtain a very clean surface (Figure 3).

When this operation is finished, the pipes are held together, end to end, by means of rings of metal $m$ or preferably of reinforced cement, poured in situ by the means usually employed in similar cases.

What I claim is:—

The process of joining a plurality of bodies, consisting in providing a porton of each of said bodies with a bituminous coating, bringing the coated portions of said bodies in contact with each other, raising the temperature of the coated portions to render said portions fluid, compressing the fluid coatings between said bodies, cooling the joint and applying an additional fluid coating of bituminous material to the joint to fill irregularities in the surface of the joint.

In testimony whereof I affix my signature.

EUGÈNE LIGONNET.